United States Patent
Linnenbrink et al.

(10) Patent No.: US 8,858,743 B2
(45) Date of Patent: Oct. 14, 2014

(54) USE OF POLYOLEFIN SEALING FILMS COATED WITH NON-REACTIVE HOT-MELT ADHESIVE FOR SEALING

(75) Inventors: Martin Linnenbrink, Apensen (DE); Doreen Janke, Alveslohe (DE)

(73) Assignee: Sika Technology AG, Baar (CH)

( * ) Notice: Subject to any disclaimer, the term of this patent is extended or adjusted under 35 U.S.C. 154(b) by 0 days.

(21) Appl. No.: 13/882,650

(22) PCT Filed: Dec. 14, 2011

(86) PCT No.: PCT/EP2011/072793
§ 371 (c)(1),
(2), (4) Date: Apr. 30, 2013

(87) PCT Pub. No.: WO2012/080353
PCT Pub. Date: Jun. 21, 2012

(65) Prior Publication Data
US 2013/0212967 A1    Aug. 22, 2013

(30) Foreign Application Priority Data
Dec. 17, 2010    (EP) .................................... 10195793

(51) Int. Cl.
| | | |
|---|---|---|
| *E04F 13/07* | (2006.01) | |
| *B32B 27/40* | (2006.01) | |
| *B32B 37/24* | (2006.01) | |
| *B29C 65/54* | (2006.01) | |
| *E04D 5/14* | (2006.01) | |
| *E04D 5/06* | (2006.01) | |
| *B32B 27/08* | (2006.01) | |
| *E04B 1/66* | (2006.01) | |
| *B32B 27/32* | (2006.01) | |

(52) U.S. Cl.
CPC *E04D 5/06* (2013.01); *E04D 5/149* (2013.01); *B32B 27/08* (2013.01); *E04D 5/148* (2013.01); *E04B 1/66* (2013.01); *E04B 1/665* (2013.01); *B32B 27/32* (2013.01)
USPC ........ 156/71; 156/242; 156/308.2; 156/309.6; 156/309.9; 156/326

(58) Field of Classification Search
USPC .......... 156/71, 155, 242, 308.2, 309.6, 309.9, 156/325, 326
See application file for complete search history.

(56) References Cited

U.S. PATENT DOCUMENTS

| 2,036,123 A | 3/1936 | Dahlander |
|---|---|---|
| 5,422,179 A * | 6/1995 | Dietschi et al. ................ 428/349 |

(Continued)

FOREIGN PATENT DOCUMENTS

| EP | 1 728 807 A1 | 12/2006 |
|---|---|---|
| EP | 2 075 297 A1 | 7/2009 |

(Continued)

OTHER PUBLICATIONS

Machine English Translation of JP 09-072198 (Jan. 19, 2006).*

(Continued)

*Primary Examiner* — Sing P Chan
(74) *Attorney, Agent, or Firm* — Oliff PLC

(57) ABSTRACT

The invention relates to a process for sealing an above-ground or underground construction. In particular it involves the use of non-reactive hot melt adhesives and flexible polyolefin films. This procedure in particular has the advantages that good and long-lasting adhesion can be achieved very quickly, and that in particular by using polyolefin strips coated with non-reactive hot melt adhesives, insulating strips can be obtained simply which are non-tacky at room temperature and can be processed and bonded easily at the construction site.

9 Claims, 3 Drawing Sheets

(56) References Cited

U.S. PATENT DOCUMENTS

| | | | |
|---|---|---|---|
| 5,479,753 | A | 1/1996 | Williams |
| 6,901,712 | B2 | 6/2005 | Lionel |
| 8,084,527 | B2 | 12/2011 | Paschkowski et al. |
| 8,398,809 | B2 | 3/2013 | Janke et al. |
| 2008/0217947 | A1 | 9/2008 | Merryman et al. |
| 2008/0250741 | A1 | 10/2008 | Bennett et al. |
| 2009/0142610 | A1* | 6/2009 | Paschkowski et al. ........ 428/480 |
| 2010/0307087 | A1 | 12/2010 | Zoellner |

FOREIGN PATENT DOCUMENTS

| | | |
|---|---|---|
| EP | 2 145 907 A1 | 1/2010 |
| JP | 09072198 A * | 3/1997 |
| WO | WO 0102700 A1 * | 1/2001 |
| WO | WO 2009/133093 A1 | 11/2009 |

OTHER PUBLICATIONS

Machine English Translation of WO 01/02700 (Nov. 13, 2013).*

International Preliminary Report on Patentability issued in International Patent Application No. PCT/EP2011/072793 dated Jun. 18, 2013.

International Search Report issued in International Patent Application No. PCT/EP2011/072793 dated Jan. 24, 2012.

Jul. 9, 2014 Office Action issued in U.S. Appl. No. 13/973,366.

* cited by examiner

USE OF POLYOLEFIN SEALING FILMS COATED WITH NON-REACTIVE HOT-MELT ADHESIVE FOR SEALING

TECHNICAL AREA

The invention involves the area of sealing an above-ground or underground construction and the area of hot melt adhesives.

STATE OF THE ART

Polyolefin sealing films have been known for quite some time. They have also been used for a long time for sealing roofs and roof constructions. Traditionally, such films have been applied as adhesive strips on the roof and heat sealed together. To set such strips in place, until now primarily mechanical means of anchoring have been used, for example, nails. Naturally for this reason assuring a watertight seal is a great problem.

However, polyolefin sealing films are difficult to bond. Existing systems are very expensive and therefore have a lot of disadvantages. Until now reactive hot melt adhesives have been used for bonding polyolefins, as disclosed in WO 2009/133093 A, where up to now reactive hot melt adhesives based on silanized grafted poly-α-olefins have been used. These adhesives are however very expensive.

PRESENTATION OF THE INVENTION

The task of this invention is to make available a process that allows sealing an above-ground or underground construction reliably and in a cost-efficient manner.

Surprisingly, it has been found that a process according to claim 1 is able to accomplish this task. In particular, this process allows the realization in a very simple manner of a long-held desire for full surface, long-term bonding of a flexible polyolefin strip to a substrate, in particular a roof or a roof construction, thus providing optimal sealing.

Surprisingly, it has been found that non-reactive hot melt adhesive compounds are optimally suited for the solution of this problem. It has been shown as especially advantageous that flexible polyolefin films coated with such non-reactive hot melt adhesive compounds are non-tacky and therefore can be stored even for long periods, particularly in roll form. When needed, they can be bonded with the substrate to be sealed by introducing heat and subsequently cooling, so that as a result a composite can be formed. It has been shown that this process very quickly leads to an adhesive bond, so that after only a few minutes, strong forces can be transferred between the polyolefin strip and the substrate bonded to it. This rapid buildup of strength is advantageous in that no mechanical fixing means such as clamps or the like are needed for the adhesion. In addition, the non-reactive hot melt adhesive compounds suited for this invention are significantly less expensive than the reactive hot melt adhesive which has been used in the state of the art for bonding polyolefins prior to this time.

The sealing films disclosed in this document can be easily produced, stored and shipped over a long period of time, and can be applied and bonded in a very simple way. In particular, no mechanical fastening means, such as nails or the like, are needed for laying and fixing. This reduces the vulnerability of films to damage. Consequently sources of leakiness are greatly reduced.

Other aspects of the invention are the subject of other independent claims. Especially preferred embodiments of the invention are the subject of dependent claims.

PATHWAYS TO EXECUTION OF THE INVENTION

In a first aspect, this invention involves a process for sealing an above-ground or underground construction. This process includes the following steps:

a) Coating a flexible polyolefin sealing film with a non-reactive hot melt adhesive compound to form a hot melt adhesive coated polyolefin sealing film, which is non-tacky at 25° C.;

b) Placing the hot melt adhesive coated polyolefin sealing film on the surface of an above-ground or underground construction;

c) Adding heat to partially melt the non-reactive hot melt adhesive compound;

d) Cooling the non-reactive hot melt adhesive compound to form an adhesive bond between the flexible polyolefin sealing film and the upper surface of the construction.

In this document "sealing film" is understood to mean flexible, that is bendable, flat plastic, particularly in a thickness from 0.05 millimeters to 5 millimeters, which can be rolled up. Thus, in addition to films in the strict sense of having thickness under 1 millimeter, also, and preferably, sealing strips such as are typically used in a thickness of typically 1 to 3 mm for sealing tunnels, roofs, and swimming pools, and in special cases even in a thickness of up to 5 mm, are understood to be included. Such films are usually created by brushing on, pouring, rolling on, or extruding, and are typically available commercially in rolls or are produced on the spot. They can be made of a single layer or of several layers. It is clear to the person skilled in the art that films can also contain additional materials and processing agents, such as fillers, UV and heat stabilizers, plasticizers, lubricants, biocides, fire retardants, antioxidants, pigments such as titanium dioxide or carbon black, and dyes. Thus in this document, films that do not consist of 100% polyolefin are also designated as polyolefin films.

In particular, a standard polyolefin sealing film for the area of sealing buildings is suitable as a flexible polyolefin sealing film or sealing film. Such polyolefin films contain, in particular, plasticizers.

Flexible polyolefin sealing films are based on flexible polyolefins, known to the person skilled in the art as "FPO." Such flexible polyolefins are homopolymers or copolymers of olefins, in particular of ethylene and propylene. In order to be able to be used in practice as a sealing film, it is important that these polyolefins be flexible. The use of rigid polyolefins would lead to a situation in which during flexion or recurvature of the film, such as may occur while applying the film or while it is in use, for example due to fluctuations in temperature or mechanical loads such as occur, for example, during walking or driving over the film, it might rupture or at least be partially torn, so that the sealing function could no longer be assured. In addition, it is almost inevitable in practice that the sealing foil must be delivered to the construction site in roll form. A rigid polyolefin however cannot be rolled up.

In order to optimize the mechanical properties of the flexible polyolefin sealing film, it is advantageous if the sealing film is reinforced with fibers. It is particularly advantageous if the polyolefin sealing film is reinforced with fibers. Reinforcement with fibers can take place in the form of loose fibers or, preferably, with flat fiber structures. Preferably, reinforcement by fibers occurs in that the polyolefin sealing film is reinforced with a fiber mat, a fiber layer, a fiber fleece, a fiber grid layer, or a fiber fabric.

It is preferred that the flexible polyolefin sealing film be reinforced with a fabric.

Particularly suited as fibers are fibers made of glass, hydrocarbon, cellulose, cotton, or synthetic plastics, preferably fibers made of polyester or of a homopolymer or copolymer of ethylene and/or propylene or of viscose. In terms of their physical form, the fibers may be used as short fibers or long fibers, or in the form of spun, woven, or nonwoven fiber materials. The use of fibers is in particular advantageous for improving the mechanical strength, in particular when at least a portion of the fibers consist of high tensile strength or extremely high tensile strength fibers, in particular made of glass or aramide. The most preferred fibers are glass fibers or polyester fibers.

Particularly preferred are flexible polyolefin sealing films that are reinforced with a glass fiber nonwoven product and/or glass or polyester scrims.

Especially appropriate flexible polyolefin sealing films are those from Sika Sarnafil AG, Switzerland, in the product lines Sarnafil® TG and Sarnafil® TS, especially Sarnafil® TS 77-15, TS 77-18, and TS-20, and the product lines Sikaplan® WT.

Underground and above-ground constructions are in particular buildings, houses, retaining walls, roofs, tunnels, and bridges. Especially preferred as underground or above-ground construction are roofs, in particular flat roofs.

In this document, "non-reactive" hot melt adhesive compound means a hot melt adhesive compound that has no polymers that chemically react with each other either at room temperature or at the melting point and that would lead to higher molecular species. Such non-reactive hot melt adhesive compounds in particular have polymers with no isocyanate, alkoxysilane, epoxide, or (meth)acrylate groups.

The non-reactive hot melt adhesive compound thus contains no epoxy resin, in particular no hard epoxy resin.

In this document "hot melt adhesive compound" means a compound that is solid at 25° C. and that melts upon heating to the melting point, thus becoming flowable. Such a hot melt adhesive compound can be applied to a substrate at an application temperature that lies above the melting point of the hot melt adhesive compound, and upon cooling becomes solid again and thereby builds adhesive strength with the substrate. Since the hot melt adhesive compound in this invention is a non-reactive hot melt adhesive compound, the hot melt adhesive compound melts again upon heating to the melting point, whereupon the adhesive bond can again be broken.

In this document "room temperature" is understood as 25° C.

In this document "melting point" is defined as the softening point measured using the ring and ball method in accordance with DIN EN 1238.

In this document "partially melting" or "partial melting" means heating the hot melt adhesive compound to a temperature that lies above what is called the crossover temperature ("$T_{crossover}$") and that lies below the softening point measured according to the ring and ball method in accordance with DIN EN 1238.

The crossover temperature, often called the flow boundary, is the temperature at which the curves of the loss modulus and the storage modulus, measured by DTMA (Dynamic-Mechanical-Thermal Analysis), intersect. In this invention, the determination of the crossover temperature by DTMA uses the following DTMA measurement parameters:

Device: Anton Paar MCR 300 SN 616966
Software US V2.3
Stamp: 25 mm plate (flat surface)
Measurement gap: (sample thickness) 1 mm
Temperature ramp: 200° C.-90° C. with −1° C./min
Frequency of oscillation: 1 Hz
Amplitudes gamma: 1% (corresponds to 0.8 mrad)

Partial melting typically occurs at a temperature that is substantially below the softening point, meaning by at least 20° C., in particular by at least 30° C., and preferably by at least 40° C.

In step a) of the process, the flexible polyolefin sealing film is coated with a non-reactive hot melt adhesive compound.

For this purpose the non-reactive hot melt adhesive compound is heated above the melting temperature, so that the hot melt adhesive compound becomes fluid and at the application temperature is applied to the flexible polyolefin sealing film.

The melting temperature of the hot melt adhesive compound should if possible be high enough so that at least it lies above the temperatures occurring in the use of the sealing film. For the sealing of an underground or above-ground construction, it is thus preferred that the melting temperature of the non-reactive hot melt adhesive compound lie between 80 and 200° C., in particular between 130 and 180° C.

The application temperature is typically chosen so that the viscosity of the melted hot melt adhesive compound allows good application with the application devices generally used with hot melt adhesives. Thus the application temperature is chosen so that the viscosity is preferably between 1500-40,000 mPa·s, measured with the Brookfield Thermosel. If too high an application temperature is used, the adhesive or the flexible polyolefin sealing film can undergo thermal damage to an unacceptable extent. Therefore the application temperature preferably is below 200° C., preferably below 190° C.

The application of the melted non-reactive hot melt adhesive compound to the flexible polyolefin sealing film takes place at the above-described application temperature, preferably by doctor blade application, spraying, painting, stamping, calendering, casting, painting, brushing, rolling, dipping, or extruding.

Application of the melted non-reactive hot melt adhesive compound onto the flexible polyolefin sealing film does not necessarily take place on a previously manufactured flexible polyolefin sealing film, but can occur directly during the manufacture of the flexible polyolefin sealing film, such as through coextruding the flexible polyolefin and the non-reactive hot melt adhesive compound. Therefore the simultaneous extrusion of flexible polyolefin and non-reactive hot melt adhesive compound can also be understood as "coating of a flexible polyolefin sealing film" in the sense of this invention.

The non-reactive hot melt adhesive compound can be applied to the full surface, as a grid, or using a special pattern.

A hot melt adhesive-coated polyolefin sealing film is created by applying the non-reactive hot melt adhesive compound and is non-tacky at 25° C.

In order to accelerate the rapid cooling to room temperature, the applied non-reactive hot melt adhesive compound can be cooled with a cooling means, such as by blowing with cold air or by cooling the film by laying the film on a pre-cooled or actively cooled body or contacting it with this cooling body.

The hot melt adhesive coated polyolefin sealing film created in this way can now be trimmed, cut, rolled up, or directly further processed as needed. The rolls of the coated plastic films can now be stored or transported as needed.

Step a) occurs preferably in an industrial process in a film plant, and the hot melt adhesive coated polyolefin sealing film gets to the construction site preferably in the form of hot melt coated polyolefin sealing film for application from a roll. It is especially advantageous that application of the non-reactive hot melt adhesive compound does not take place at the construction site, something that is highly advantageous from the viewpoint of occupational and industrial safety in view of the high application temperatures and the related danger of fire and burns. In addition, one does not have to wait at the construction sites until the hot melt compound is applied and cooled, thus allowing greatly accelerated work at the worksite. Based on the property that the hot melt adhesive-coated polyolefin sealing film is non-tacky, the coated film can be simply rolled up, stored and transported in a space-saving manner on a roll, and unrolled as needed. Preferably individual layers on the roll do not adhere to one another, meaning that preferably no blocking of the rolls occurs while in storage, in particular in long-term storage. In certain, non-preferred cases, however, it may be advisable to prevent blocking completely by laying down a separating paper, in particular a siliconized separating paper, onto the coated film before rolling up.

Non-reactive hot melt adhesive compounds are solid at room temperature, and melt upon heating above the melting point, becoming fluid. To be precise, however, one cannot speak of a "melting point" for a polymer. That is why in this document "melting point" is defined as the softening point measured by the ring and ball method in accordance with DIN EN 1238. The molten hot melt adhesive compounds are typically applied at a temperature that is higher than the softening point, typically at least 20° C. higher. This temperature, called the "application temperature", typically lies between 140 and 200°, between 150 and 180° C. At the application temperature, the adhesive has a viscosity that allows a single application. The viscosity, determined with the Brookfield Thermosel, preferably amounts to 1500-50,000 mPa·s in this temperature range. If it is much higher, application is very difficult. If it is much lower, the adhesive is so thin that it runs off from the material surface to be bonded during application before it solidifies by cooling. Particularly preferred in a temperature range of 150 to 180° is a viscosity of 2500-20,000 mPa·s, measured with the Brookfield Thermosel.

Unsuitable non-reactive hot melt adhesive compounds are those that are tacky at 25° C. Whether a hot melt adhesive compound is tacky or not can be easily determined by momentarily pressing the surface with a finger. In doubtful cases, powdered chalk can be spread on the surface of a non-reactive hot melt adhesive at 25° C.; then the surface tipped so that the powdered chalk falls off. If the residual powdered chalk remains visibly adhering to the surface, the adhesive is considered tacky.

Preferred embodiments of hot melt adhesive compounds in a preferred embodiment are those that contain a thermoplastic poly-α-olefin, preferably an atactic poly-α-olefin (APAO), that is solid at 25° in a quantity of more than 50% by weight, preferably more than 60% by weight, based on the quantity of the non-reactive hot melt adhesive compound.

In this document, the term "α-olefin" is used in the standard definition of an alkene of the general formula $C_xH_{2x}$ (x corresponds to the number of carbon atoms) which has a C-C double bond on the first carbon atom (α-carbon). Examples of α-olefins are ethylene, propylene, 1-butene, 1-pentene, 1-hexene, 1-heptene, and 1-octene. Consequently, for example, 1,3 butadiene, 2-butene, and styrene are not α-olefins in the sense of this document.

In this document, "poly-α-olefins" are understood in the standard definition as homopolymers of α-olefins and copolymers of several different α-olefins. Atactic poly-α-olefins (APAO) have an amorphous structure, in contrast to other polyolefins. Preferably these atactic poly-α-olefins have a softening point of over 90° C., in particular between 90° C. and 130° C. The molecular weight $M_n$ amounts to in particular between 7,000 and 25,000 g/mol. Particularly preferred atactic poly-α-olefins are obtainable under the commercial name Vestoplast® from Degussa.

Particularly preferred are propylene-rich atactic poly-α-olefins and partially crystalline propylene-ethylene-butylene terpolymers.

In another embodiment, the non-reactive hot melt adhesive compound contains a copolymer solid at 25° C., which is obtained from the free radical polymerization of at least 2 monomers with at least one, preferably one, unsaturated C=C double bond, preferably an ethylene/vinyl acetate copolymer, in particular in a quantity of more than 50% by weight, preferably more than 60% based on the quantity of the non-reactive hot melt adhesive compound.

Ethylene-vinyl acetate copolymers (EVA) have proved to be preferred, in particular those with a vinyl acetate proportion of under 50%, in particular with a vinyl acetate proportion between 10 and 40%, preferably 15 to 30%.

The non-reactive hot melt adhesive compound also advantageously contains polyolefins, hydrocarbon resins solid at 23° C., soft resins such as maleic acid-grafted polyolefins, and UV and/or heat stabilizers.

A hydrocarbon resin solid at 23° C. preferably has a softening point of 100 to 140° C., in particular between 110 and 130° C. It has been shown to be especially advantageous if the percentage of all the hydrocarbon resins solid at 23° C. is a maximum of 20% by weight, in particular a maximum of 16% by weight, preferably between 10 and 16% by weight, based on the hot melt adhesive compound.

A soft resin has a softening point between −10° C. and 40° C. Based on the fact that the soft resin (WH) at room temperature (23° C.) is quite close to its melting or softening point, at room temperature it is already fluid or very soft. A soft resin can be a natural resin or a synthetic resin. In particular, such soft resins are medium to higher molecular weight compounds from the classes of paraffins, hydrocarbon resins, polyolefins, polyesters, polyethers, polyacrylates, and amino resins. The soft resin preferably has a melting point or softening point between 0° C. and 25° C., in particular 10° C. and 25° C. The soft resins are used only in small amounts. Preferably, the percentage of all soft resins is a maximum of 20% by weight based on the hot melt adhesive compound.

Maleic acid-grafted polyolefins are especially preferred, since they are advantageous in terms of adhesion. It has been shown as particularly advantageous if such maleic acid-grafted polyolefins are maleic acid-grafted polypropylenes, in particular with a molecular weight between 7,000 and 14,000 g/mol. It has shown to be especially advantageous if the percentage of all the maleic acid-grafted polyolefins is a maximum of 20% by weight; in particular a maximum of 15% by weight, preferably less than 10% by weight, based on the hot melt adhesive compound.

Furthermore, the non-reactive hot melt adhesive compound can have other ingredients. Appropriate other ingredients are in particular ingredients that are selected from the group including plasticizers, bonding agents, UV absorption agents, UV and heat stabilizers, optical brighteners, fungicides, pigments, dyes, fillers, and drying agents.

The non-reactive hot melt adhesive compound preferably has a melting point of 80 to 200° C., in particular 130 to 180° C., measured as the softening point according to the ring and ball method in conformity with DIN EN 1238.

The amount of non-reactive hot melt adhesive compound applied in step a) typically amounts to between 50 and 300 g/m², in particular from 100 to 200 g/m², preferably 100 to 150 g/m². The thickness of the coating of the non-reactive hot melt adhesive compound preferably amounts to between 50 and 500 microns, in particular between 50 and 100 microns.

In this process, in a step b) following step a), the hot melt adhesive compound-coated polyolefin sealing foil is applied on the surface of an underground or above-ground construction. Applying the coated film is done in such a way that the non-reactive hot melt adhesive compound is situated between the flexible polyolefin sealing film and the surface of the construction.

The film is movable on the surface due to the lack of tackiness of the hot melt adhesive coated polyolefin sealing film. However, based on the weight of the polyolefin sealing film coated with the adhesive, a certain minimum force is required for moving it. This is an advantage because an undesired move can thus be prevented. For example, on inclined surfaces an undesired slippage or unwinding because of slight winds can be in the main prevented. The minimum force required for moving can be adjusted with the choice of the additives (e.g., fillers) or the thickness of the film; the surface construction of the hot melt adhesive coated polyolefin sealing film can also be decisively affected by the stiction. For example, the stiction can be increased by a rough adhesive surface, which for example is a result of an uneven application of adhesive or adhesive applied in a grid shape.

The surface of the construction can consist of various materials. In particular, such surface materials are concrete, plaster, stone, brick, mortar, fiber cement, and natural stone such as granite or marble; metals or alloys such as aluminum, steel, non-ferrous metals, and galvanized metals; wood, insulating foam, polyisocyanurate resins (PIR); coated substrates such as coated metals or alloys; and paints and varnishes. Particularly preferred are materials that are used as a roof underlayer.

If necessary, the substrates can be pretreated before applying the adhesive or the sealing material. Such pretreatments include in particular physical and/or chemical cleaning processes, for example, polishing, sandblasting, brushing, or similar methods, or treating with cleaning agents, solvents, or applying a bonding agent, a bonding solution, or a primer.

In one embodiment of the invention, as in the described process, the coated surface 4 of an underground or above-ground construction 5 is coated with a hot melt adhesive, as obtained with a supplemental step a'):

a') Applying a non-reactive hot melt adhesive compound 2 to the surface 4 of an underground or above-ground construction 5.

It is crucial here that that step a') takes place before step b).

In a further step c) of the process, heat is introduced so that the non-reactive hot melt adhesive compound adheres by melting.

Introducing heat in step c) is preferably done in such a way that the temperature of the hot melt adhesive compound does not exceed a temperature that is at least 30° C., preferably at least 40° C., below the melting point, meaning below the softening point, of the hot melt adhesive compound.

The introduction of heat can preferably be done in step c) during the application of the hot melt adhesive coated polyolefin sealing film 3 in step b), in particular into the gap 6 formed during the application between the hot melt adhesive coated polyolefin sealing film 3 and the surface 4 of a construction 5.

In another embodiment, the introduction of heat is done in step c) on the side of the polyolefin sealing film 1 placed opposite the hot melt adhesive compound 2, and is transferred via (through) the polyolefin sealing film 1 to the hot melt adhesive compound 2.

The introduction of heat can be done with hot air, flame, induction, or dielectric heating. The introduction of the heat is preferably done in such a way that the heat does not have an excessive negative thermal effect on or even destroy the film, the adhesive, or the material of the surface of the construction.

Since the hot melt adhesive compound partially melts, the hot melt adhesive compound is at least partially flowable, guaranteeing intimate contact with the surface of the construction is assured.

The heating of the adhesive occurs in particular to an adhesive temperature of 70 to 130° C.

In a step d) that comes after step c), the hot melt adhesive compound 2 is cooled and forms an adhesive bond between the flexible polyolefin sealing film 1 and the surface of the construction 5. This cooling typically occurs without other auxiliaries. In certain cases, however, it can be advisable and advantageous if the cooling is accelerated, if for example the film is supposed to bear a load or be walked on after a short time. This can for example occur by having a cooling means cool the film or the construction, such as a blower, particularly an air blower.

Through this process as described the underground or above-ground construction is sealed. This sealing is in particular a sealing against water, in particular against rain water or construction water. With this process, constructions can be reliably sealed for long periods of time, typically several years, in particular more than 10 or 20 years.

Thus the use of a non-reactive hot melt adhesive coated flexible polyolefin sealing film 3, which is non-tacky at 25° C., for sealing an underground or above-ground construction is an additional aspect of the present invention.

Finally, a composite 8 forms another aspect of this invention.

This composite 8 has
i) a layer of a polyolefin sealing film 1
ii) a layer of a hot melt adhesive compound 2
iii) an underground or above-ground construction 5.

The layer of the hot melt adhesive compound 2 in this case is disposed between the layer of the polyolefin sealing film 1 and the underground or above-ground construction 5.

In this case the underground or above-ground construction 5 is in particular a roof.

BRIEF DESCRIPTION OF THE DRAWINGS

In the following the invention will be described in further detail based on preferred embodiments with the aid of the figures, wherein it is noted that only the elements essential for direct understanding of the invention are shown. Equivalent elements in the various figures are labeled with the same symbols. It is also pointed out that the figures presented here are schematic representations not drawn to scale.

They show.

Figure 1:
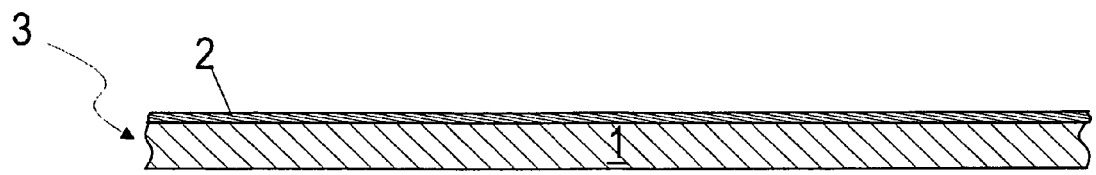
FIG. 1 a schematic cross-section through a flexible polyolefin sealing film or sealing strip, onto which a non-reactive hot melt adhesive compound is applied.

The following figures schematically show individual stages of a process for sealing an underground or above-ground construction:

FIG. 1 shows a flexible polyolefin sealing film 1, on which a non-reactive hot melt adhesive compound 2 has been applied as a coating to a flexible polyolefin sealing film 1 in step a), with the formation of a hot melt adhesive coated polyolefin sealing film 3, which is non-tacky at 25° C. The lack of tackiness makes it possible for the adhesive or the foil to be rolled up without any problem, as described in FIG. 2. In addition, the film is freely movable and does not stick in an undesirable way to a substrate and is advantageous because dust or other small particles do not remain stuck to the surface and thereby contaminate the surface of the film or give it an unattractive appearance.

Figure 2:
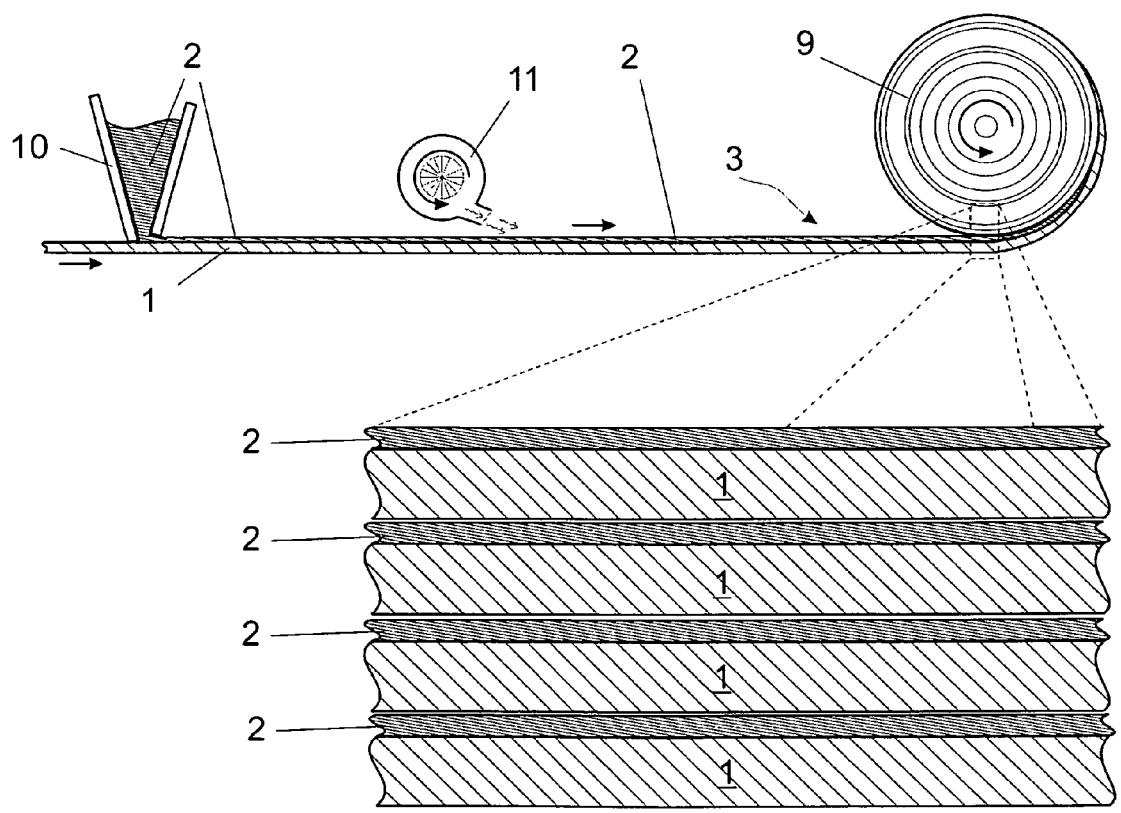
FIG. 2 a schematic representation of a manufacturing process of a hot melt adhesive coated polyolefin sealing film; cross-section through a hot melt adhesive coated polyolefin sealing film rolled up into a roll.

FIG. 2 shows that the hot melt adhesive coated polyolefin sealing film 3 or sealing strip 3 can be rolled up into a roll 9. In the schematic representation shown here, the hot melt adhesive compound 2 is melted and by means of an application device 10, for example a wide slit jet applicator, is applied to the flexible polyolefin sealing film 1. For this purpose the polyolefin sealing film is moved under the application system 10. Typically the polyolefin sealing film is unrolled from a roll (not shown). In order to assure faster cooling to room temperature, a cooling means 11 (for example, an air blower) is applied to the material in the embodiment shown here. FIG. 2 also shows that the hot melt adhesive coated polyolefin sealing film 3 manufactured in this way is rolled up. Moreover, in the lower part of FIG. 2 an enlarged schematic cutout of a roll 9 with hot melt adhesive coated polyolefin sealing film 3 is shown. When the coated sealing film is rolled up, the individual layers of the rolled-up hot melt adhesive coated polyolefin sealing film 3 are in direct contact with one another, and in particular have no intermediate layers of a separating paper. The hot melt adhesive coated polyolefin sealing film 3 can if needed be unrolled from the roll 9 without blocking, even after prolonged storage or transport. The roll 9 can be stored over long periods of time and transported in a space-saving manner, and if needed unrolled at the film plant or at the construction site, and in any case can be trimmed to the desired strip length.

In the embodiment shown here, the rolling takes place without the use of a siliconized separating paper, which would be applied on the adhesive when rolling up and which would then prevent individual layers in the roll from sticking to each other.

Figure 3:
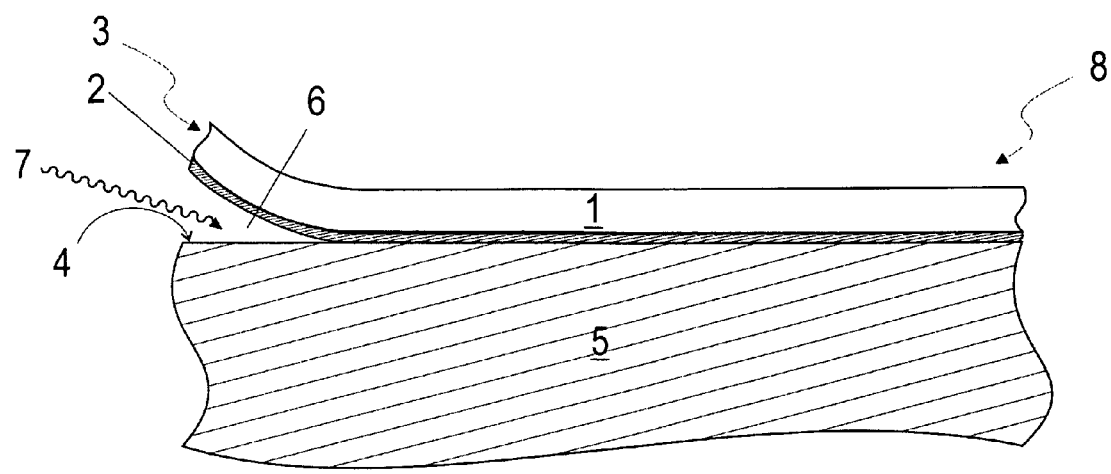
FIG. 3 a schematic cross-section through a composite after its manufacture in a first embodiment.
Figure 4:
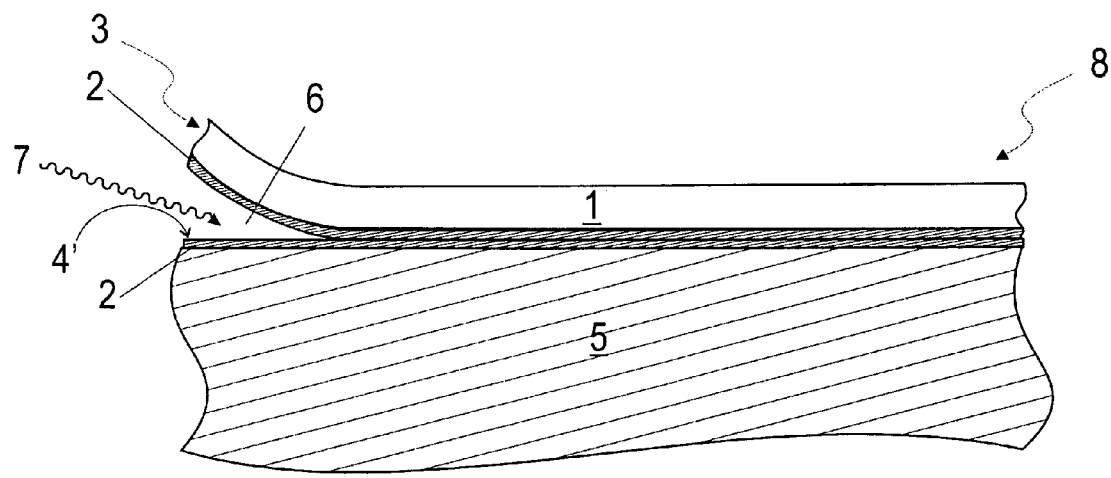
FIG. 4 a schematic cross-section through a composite after its manufacture in a second embodiment.

FIGS. 3 and 4 show steps b) and c) of the process.

A first embodiment is shown in FIG. 3. Here in step b) the hot melt adhesive coated polyolefin sealing film 3 is applied on the surface 4 of the underground or above-ground construction 5. Due to the lack of tackiness of the film, it can be moved on the surface 4, thus permitting for example a final positioning of the film. Because of the weight of the film, the film has a certain inertia, which largely prevents undesired movement, for example through slippage or the effect of the wind. Moreover, FIG. 3 shows a variant of step c). Here the introduction of heat in step c) occurs through laying the hot melt adhesive coated polyolefin sealing film 3 in step b) into the gap 6 formed during the laying step between the hot melt adhesive coated polyolefin sealing film 3 and the surface 4 of a construction 5. Because of the heat, partial melting of the hot melt adhesive compound 2 occurs. Thus the hot melt adhesive compound becomes soft or slightly tacky and contact the surface 4 of the construction. In the next step d), the hot melt adhesive compound 2 cools down again, whereupon an adhesive bond occurs between the flexible polyolefin sealing film 1 and the surface of the construction 5; as a result a composite 8 is formed. This composite 8 has a layer of polyolefin sealing film 1, a layer of a hot melt adhesive compound 2, and an underground or above-ground construction 5. The layer of the hot melt adhesive compound 2 is in this case disposed between the layer of the polyolefin sealing film 1 and the underground or above-ground construction 5.

FIG. 4 shows a second embodiment. Essentially this corresponds to FIG. 3, except that the surface 4 of the construction shows a surface 4' coated with a hot melt adhesive compound 2. Such a surface 4' is obtained before laying down via the additional step a'). In step a'), a non-reactive hot melt adhesive compound 2 is applied to the surface 4 of the underground or above-ground construction 5, and then step b) is executed.

Figure 5:
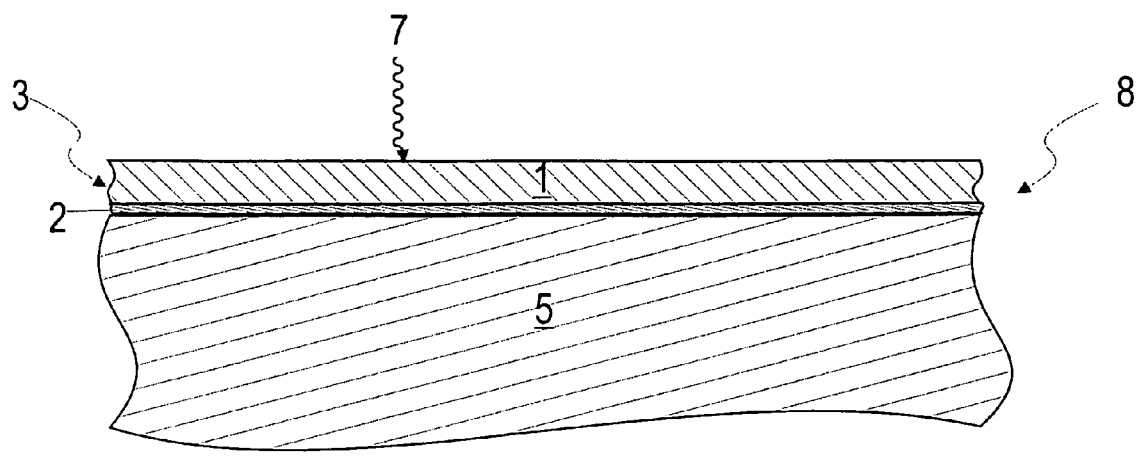
FIG. 5 a schematic cross-section through a composite after its manufacture in a third embodiment.

FIG. 5 shows a third embodiment. Here the heat is introduced using a heat source 7 in step c) onto the side of the polyolefin sealing film 1 opposite the hot melt adhesive compound 2, and is transferred through the polyolefin sealing film 1 onto the hot melt adhesive compound 2. Due to the heat, partial melting of the hot melt adhesive compound 2 occurs. In this process the hot melt adhesive compound becomes at least partially fluid and can bond with the surface 4 of the construction. In the next step d), the hot melt adhesive compound 2 is cooled once again, whereupon an adhesive bond forms between the flexible polyolefin sealing film 1 and the surface of the construction 5; as a result, as described in FIG. 4, a composite 8 is formed.

EXAMPLES

In the following, the invention will be illustrated on the basis of examples.

To a flexible polyolefin sealing film Sarnafil® TS 77-18, reinforced with a polyester scrim available from Sika Sarnafil AG, Switzerland, in a thickness of 1.8 mm, was applied 150 g/m² of a non-reactive hot melt adhesive SikaMelt®-9171, obtainable from Sika Automotive GmbH, Germany, melted by heating to 180° C. After cooling to room temperature, the adhesive coated flexible polyolefin film coated in this way was trimmed into 5×20 cm strips.

The adhesive coated flexible polyolefin film manufactured in this way was non-tacky at 23° C., as determined by dusting with powdered chalk. When the foil was placed upright, all the powdered chalk fell off of the surface of the adhesive, so that visually no chalk could any longer be discovered on the surface.

The adhesive coated flexible polyolefin film strips produced in this way were applied on a concrete garden path plate and on a zinc plate, so that the adhesive coated side came into contact with the substrate to be bonded. The strips were removed, and hot air was blown into the gap by use of a heat gun or a flame so that the temperature measured in the adhesive was between 115° C. and 135° C.; it was then pressed with a 5 kg roller. Immediately after the cooling of the composite to room temperature, the peel resistance was measured with a tension testing machine (angle 90°, speed of advance 100 mm/min), as shown in table 1.

SikaMelt®-9171 has a softening point of 160° C., as measured by the ring and ball method according to DIN EN 1238, and a crossover temperature of 109° C., determined by DTMA according to the method described above.

TABLE 1

| Peel resistances of bonded substrates | | | | |
|---|---|---|---|---|
| | Heat gun | | Flame | |
| | Concrete | Zinc sheet | Concrete | Zinc sheet |
| Peel resistance (N/5 cm) | 90 | 366 | >100 | 413 |

REFERENCE NUMBERS

1 Flexible polyolefin sealing film or sealing strip
2 Non-reactive hot melt adhesive compound
3 Hot melt coating polyolefin sealing film
4 Surface
4' Surface coated with hot melt adhesive 2
5 Underground or above-ground construction
6 Gap
7 Heat source
8 Composite
9 Roll
10 Applicator
11 Cooling means

The invention claimed is:

1. Process for sealing an underground or above-ground construction, including the steps:
   a) coating a flexible polyolefin sealing film with a non-reactive hot melt adhesive compound to form a hot melt adhesive coated polyolefin sealing film, which is non-tacky at 25° C.;
   b) laying the hot melt adhesive coated polyolefin sealing film on the surface of an above-ground or underground construction;
   c) adding heat to partially melt the non-reactive hot melt adhesive compound;
   d) cooling the non-reactive hot melt adhesive compound to form an adhesive bond between the flexible polyolefin sealing film and the surface of the construction,
   wherein the introduction of the heat in step c) occurs in such a way that the temperature of the hot melt adhesive compound does not exceed a temperature that is at least 30° C., below the melting point of the hot melt adhesive compound, and
   wherein the non-reactive hot melt adhesive compound contains no epoxy resin.

2. Process according to claim 1, wherein the non-reactive hot melt adhesive compound is a thermoplastic poly-α-olefin solid at 25° C., in a quantity of more than 50% by weight, based on the quantity of the non-reactive hot melt adhesive compound.

3. Process according to claim 1, wherein the non-reactive hot melt adhesive compound contains a copolymer that is solid at 25° C., which is obtained by free radical polymerization of at least two monomers with at least one, unsaturated C═C double bond, in a quantity of more than 50% by weight, based on the quantity of the non-reactive hot melt adhesive compound.

4. Process according to claim 1, wherein the non-reactive hot melt adhesive compound has a melting point of 80 to 200° C.

5. Process according to claim 1, wherein, the non-reactive hot melt adhesive compound in step a) is applied in the amount of 50 to 300 g/m$^2$.

6. Process according to claim 1, wherein the surface of an underground or above-ground construction is a surface coated with hot melt adhesive, as obtained through the additional step a')
   a') applying a non-reactive hot melt adhesive compound to the surface of an underground or above-ground construction;
   with the provision that step a') takes place before step b).

7. Process according to claim 1, wherein the introduction of heat in step c) occurs during the application of the hot melt adhesive coated polyolefin sealing film in step b), into the gap formed during the application between the hot melt adhesive coated polyolefin sealing film and the surface of a construction.

8. Process according to claim 1, wherein the introduction of heat in step c) takes place on the side of the polyolefin sealing film opposite from the hot melt adhesive compound, and is transferred onto the hot melt adhesive compound through the polyolefin sealing film.

9. Process according to claim 1, wherein the flexible polyolefin sealing film is reinforced with a fabric.

* * * * *